United States Patent [19]

Colucci et al.

[11] Patent Number: 5,165,947
[45] Date of Patent: Nov. 24, 1992

[54] CONTROLLED ATMOSPHERE, CONTROLLED HUMIDITY PACKAGE FOR RED-RIPE TOMATOES

[75] Inventors: Michael J. Colucci, Saginaw; Douglas P. Gundlach, Midland; Richard M. Remenar, Saginaw; Ronald J. Weeks, Midland, all of Mich.

[73] Assignee: DowBrands, Inc., Indianapolis, Ind.

[21] Appl. No.: 796,903

[22] Filed: Nov. 22, 1991

Related U.S. Application Data

[63] Continuation of Ser. No. 499,850, Mar. 29, 1990, abandoned.

[51] Int. Cl.$^5$ .............. A23B 7/14; B65D 81/02; B65D 81/26; B65D 85/34
[52] U.S. Cl. .................. 426/124; 426/119; 426/396; 426/398; 426/419; 206/204; 206/521.1; 206/521.8; 220/507
[58] Field of Search ............ 426/124, 112, 419, 106, 426/119, 398, 396; 217/26.5, 27; 206/204, 592, 593, 521; 521.1–521.9; 220/507

[56] References Cited

U.S. PATENT DOCUMENTS

| | | | |
|---|---|---|---|
| 1,042,928 | 10/1912 | Kopf | 206/592 |
| 1,601,625 | 9/1926 | Hruby | 426/124 |
| 1,726,573 | 9/1929 | Lang | 206/205 |
| 1,828,179 | 10/1931 | Gallagher | 426/124 |
| 1,985,670 | 12/1934 | Sykes | 206/589 |
| 2,497,399 | 2/1950 | Dexter | 426/124 |
| 2,652,335 | 9/1953 | Conti | 426/106 |
| 2,660,529 | 11/1953 | Bloom | 426/106 |
| 2,708,028 | 5/1955 | Murphy et al. | 426/106 |
| 2,887,389 | 5/1959 | Linville | 426/106 |
| 3,084,842 | 4/1963 | Beech | 217/26.5 |
| 3,224,569 | 12/1965 | Leitzel | 426/396 |
| 3,229,814 | 1/1966 | Cowman | 206/593 |
| 3,392,902 | 7/1968 | Donovan | 426/124 |
| 3,450,543 | 6/1969 | Badran et al. | 426/419 |
| 3,464,618 | 9/1969 | Martelli et al. | 217/26.5 |
| 3,507,667 | 4/1970 | Magnen | 426/415 |
| 3,516,596 | 6/1970 | Madden et al. | 206/521.1 |
| 3,552,634 | 1/1971 | Ollier | 426/396 |
| 3,561,668 | 2/1971 | Bergstrom | 426/396 |
| 3,695,505 | 10/1972 | Wolf | 426/124 |
| 3,804,961 | 4/1974 | Cummin et al. | 426/415 |
| 3,853,221 | 12/1974 | Boyd | 206/592 |
| 3,861,578 | 1/1975 | McHan | 206/521.1 |
| 4,061,785 | 12/1977 | Nishino et al. | 426/106 |
| 4,079,152 | 3/1978 | Bedrosian et al. | 426/415 |
| 4,127,228 | 11/1978 | Hall | 206/521.1 |
| 4,256,770 | 3/1981 | Rainey | 426/124 |
| 4,411,921 | 10/1983 | Woodruff | 426/419 |
| 4,423,080 | 12/1983 | Bedrosian et al. | 426/419 |
| 4,528,228 | 7/1985 | Clevenger | 426/124 |
| 4,556,147 | 12/1985 | Magnussen | 426/124 |
| 4,622,229 | 11/1986 | Toshitsugu | 426/415 |
| 4,697,703 | 10/1987 | Will | 206/525 |
| 4,757,899 | 7/1988 | Magnussen et al. | 426/106 |
| 4,842,875 | 6/1989 | Anderson | 426/415 |

FOREIGN PATENT DOCUMENTS

| | | | |
|---|---|---|---|
| 0000824 | 2/1979 | European Pat. Off. | 206/521.1 |
| 2467795 | 5/1981 | France | 426/124 |
| 2567853 | 1/1986 | France | 426/124 |

OTHER PUBLICATIONS

CSIRO Food Res.Q 44(2) 25-33, 1984.
Modern Packaging vol. 40, #2, 1966.

*Primary Examiner*—Steven Weinstein

[57] ABSTRACT

Disclosed is a controlled atmosphere package suitable for delivery of red-ripe tomatoes to the consumer. The package maintains the tomato in a substantially fixed position relative to the package regardless of the orientation of the package, and further maintains a substantially uniform relative humidity inside the package. Further disclosed is a process for packaging a tomato comprising providing a package which maintains the tomato in a substantially fixed position relative to the package regardless of the orientation of the package, and further maintains a substantially uniform relative humidity inside the package.

13 Claims, 4 Drawing Sheets

CONTROLLED ATMOSPHERE, CONTROLLED HUMIDITY PACKAGE FOR RED-RIPE TOMATOES

CROSS-REFERENCE TO RELATED APPLICATION

This is a continuation of application Ser. No. 499,850 filed Mar. 29, 1990, now abandoned.

BACKGROUND OF THE INVENTION

The present invention relates to a package suitable for delivery of red-ripe fresh tomatoes to the consumer. The package ensures the physical protection of the tomatoes, and maintains them in the red-ripe stage for about 7 to about 14 days at customary room temperature.

There is considerable demand among consumers for red-ripe fresh tomatoes. Provision of such tomatoes to consumers by growers and industry has been difficult due to the limited time length of the red-ripe stage and the susceptibility of red-ripe tomatoes to bruising, rupture, and microbial attack. Bruising and physical damage accelerates respiration and water loss, thus shortening the length of the red-ripe stage and causing senescence and shriveling of the tomatoes.

Most red-ripe tomatoes available in the marketplace are harvested in the mature green stage of ripening and subsequently exposed to ethylene gas to initiate ripening off the vine. The tomatoes are then quickly shipped in bulk to their final destination so that they will be in the red-ripe stage at the time of sale to the consumer. This method is used because tomatoes picked in the red-ripe stage or in the red-green stage off the vine will be over-ripe by the time of sale to the consumer. Problems with this method include bruising due to bulk shipping and reduced flavor in the tomatoes themselves due to picking in the green stage rather than in the vine-ripe stage.

Representative prior art packages for storing or delivering tomatoes are seen in U.S. Pat. Nos. 3,804,961 (Cummin) and 4,079,152 (Bedrosian). Cummin teaches the packaging of tomatoes placed side by side in a tray with an overwrap of oxygen and carbon dioxide permeable film. The selection of the film is dependent upon the stage of ripening at which the contained tomatoes were picked. The Cummin package provides little physical protection for the tomato, and depends completely upon the water vapor transmission rate of the overwrap to determine relative humidity in the package. Bedrosian teaches the packaging of tomatoes in a tray or container having a film overwrap and a water absorbing material in the package. The Bedrosian package offers little physical protection to tomatoes, and may permit tomatoes to prematurely shrivel due to selection of a less than desirable water-absorbing material such as calcium chloride.

Accordingly, there exists a need for a tomato package which offers physical protection for the tomatoes and provides a controlled atmosphere, controlled humidity environment within the package to maximize the freshness and longevity of tomatoes in the red-ripe stage. Further, there exists a need for a package that will maintain humidity at a level to prevent or minimize shriveling as well as substantially eliminate mold growth. Further, there exists a need for a package that will maintain a substantially uniform relative humidity throughout the package. Further, there exists a need for a tomato package that will essentially maintain headspace oxygen concentration at a subambient level and headspace carbon dioxide concentration at a superambient level.

SUMMARY OF THE INVENTION

According to the present invention, there is disclosed a package containing at least one tomato wherein the package comprises a relatively rigid plastic enclosure which defines an opening therein. The tomato is situated within the enclosure. The tomato is held in a substantially fixed position relative to the package regardless of the orientation of the package. A relatively non-rigid gas permeable plastic film is situated about and in air-tight sealment with the enclosure at the opening therein. A humectant material is contained within a packet having water vapor permeable, liquid water impermeable walls. The packet is situated within the enclosure preferably adjacent the stem scar. A substantially uniform relative humidity is maintained in all regions of the enclosure.

According to the present invention, there is a process for packaging a tomato comprising providing a package which defines a chamber therein, introducing a tomato within the chamber, maintaining the tomato in a substantially fixed position relative to the package regardless of the orientation of the package, and maintaining a substantially uniform relative humidity in the chamber.

BRIEF DESCRIPTION OF THE DRAWINGS

The novel features of the present invention and the context within which they set will be better understood upon reviewing the following specification together with the drawings.

DETAILED DESCRIPTION OF THE INVENTION

Figure 1:
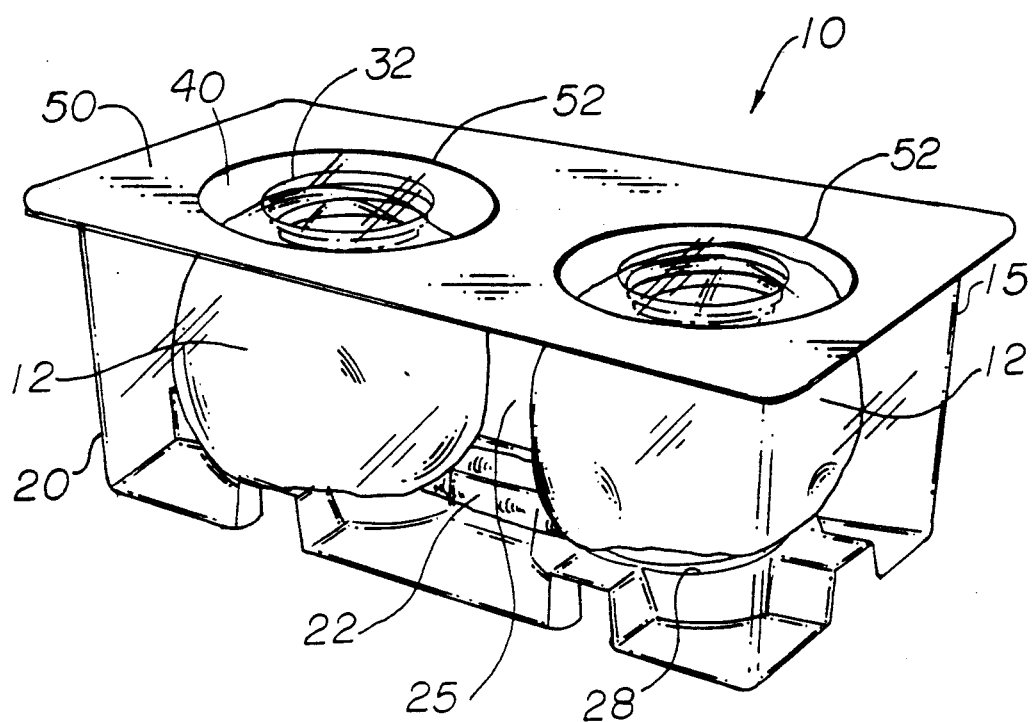
FIG. 1 is an isometric view of a controlled atmosphere, controlled humidity package for red-ripe tomatoes according to the present invention with tomatoes therein.
Figure 2:
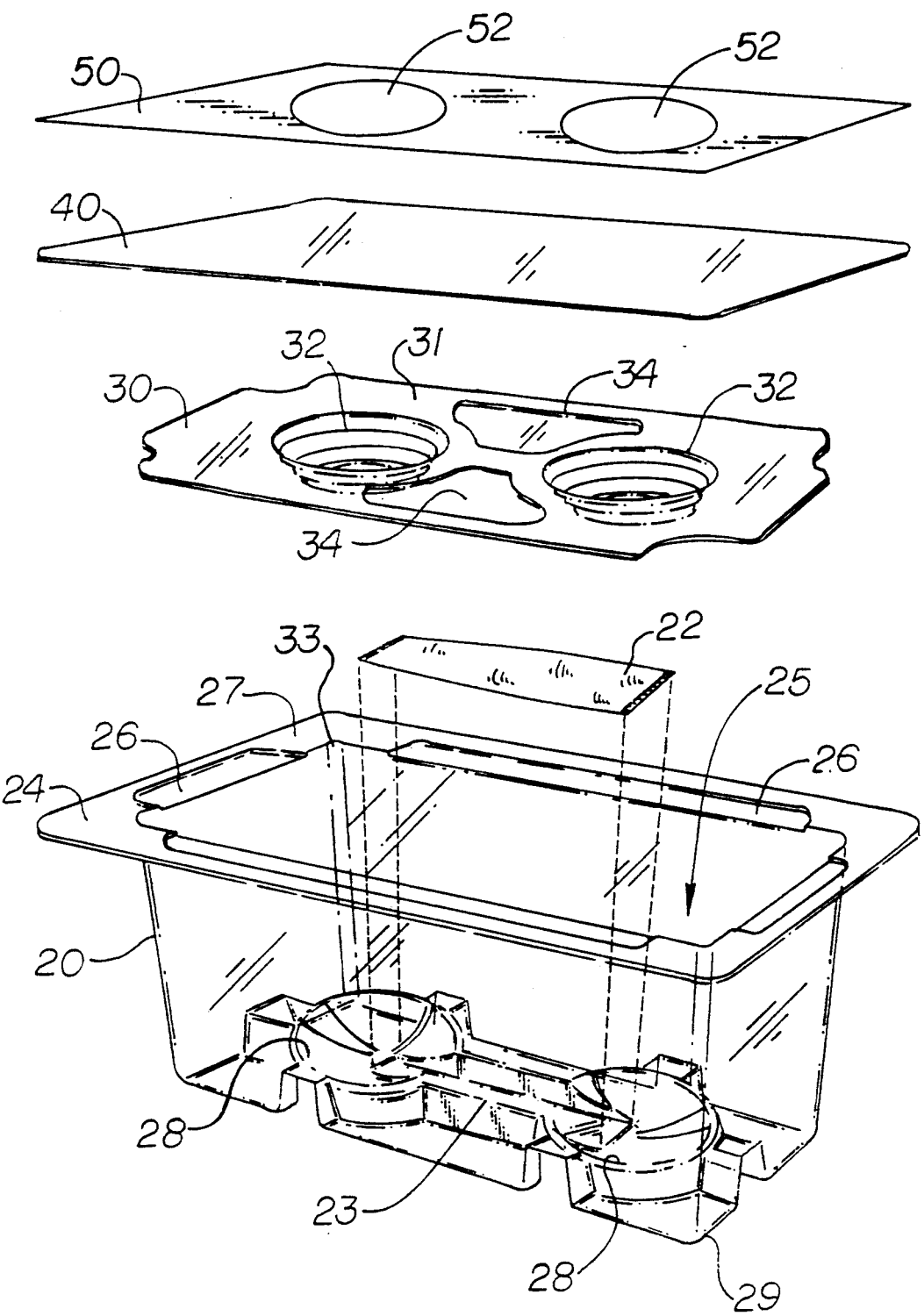
FIG. 2 is an exploded isometric view of the package of FIG. 1.

A controlled atmosphere, controlled humidity package for red-ripe tomatoes according to the present invention is referenced generally by the numeral 10 as illustrated in FIG. 1 with tomatoes therein. Package 10 comprises a relatively rigid plastic enclosure 15, a packet 22 of a humectant material, and a film 40. Enclosure 15 comprises a tray 20 and an insert 30. Package 10 is seen in an exploded view in FIG. 2.

Tray 20 defines the bulk of package 10, and defines a chamber 25 adapted to receiving one or more tomatoes 12. Preferably, tray 20 is large enough to accommodate two tomatoes though packages for one tomato or more than two tomatoes are within the scope of the invention. The size of tray 20 and chamber 25 are determined by the size of tomatoes 12 it will hold. Preferably, tomatoes 12 weigh from about 180 to about 230 grams each, have a diameter of about 3 inches, and have a height of about 2 ½ inches. Package 10 is preferably from about 6 to about 8 inches in length, from about 3 to about 5 ½ inches in width, and from about 2 ½ to about 3 ½ inches in height.

Tray 20 forms an opening 33 bounded by a lip 24. Lip 24 is preferably substantially flat and preferably parallel with the bottom of tray 20. Lip 24 defines outwardly-extending flange portions 27 and inner portions 26, which are localized depressions adapted to receive peripheral portions of insert 30. When such peripheral portions are engaged within inner portions 26, flange portions 27 and insert 30 are preferably coplanar. Tray 20 further defines bottom cradles 28 which are adapted to receive and/or are in an adjacent contact with surfaces of tomatoes 12. Tray 20 further defines a trough 23, which may be substantially retentionally coextensive with and adapted to receiving packet 22. Trough 23 opens toward chamber 25 and insert 30.

Package 10 defines means for holding and maintaining tomatoes 12 in a substantially fixed position with respect to the remainder of package 10 regardless of the orientation of package 10. In other words, the position of tomatoes 12 with respect to the remainder of package 10 will be substantially the same whether package 10 is in an upright position, upside down, or sideways. In the particular embodiment shown, package 10 maintains tomatoes 12 in a substantially fixed position by providing various surfaces located above, below, and lateral to tomatoes 12 in the form of a tray 20, cradles 28 defined by tray 20, and an insert 30. To maintain the tomatoes in a substantially fixed position with respect to the remainder of the package regardless of the orientation of the package does not necessarily mean to prevent all movement of the tomatoes whatsoever, but does mean to keep the tomatoes in the same general position with respect to the remainder of the package when the package is subject to normal attendant handling.

Figure 3:
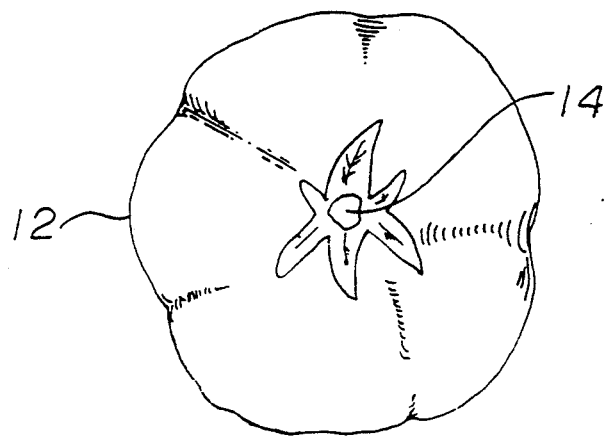
FIG. 3 is a top view of a tomato.

Tomatoes 12, a representative specimen of which is seen in FIG. 3, may rest upside down within tray 20 and package 10 with their stem scars 14 toward the bottom of package 10. Tomatoes 12 may by be situated top end or stem scar end down upon and in contact with cradles 28. Alternatively, tomatoes 12 may be situated top end or stem scar end up within package 10. Stem scars 14 are preferably situated in proximity with packet 22, and more preferably situated within 1 inch of packet 22. Since most of the water vapor transpiring from a tomato is emitted through the stem scar, proximity to a packet of humectant material allows the water vapor to be absorbed rather than accumulate to form liquid water on the surface of the tomato in the area of the stem scar. Buildup of liquid water is undesirable because it can accelerate mold formation.

Insert 30 provides several functions in package 10 including functioning as an internal lid for tray 20, preventing contact between tomatoes 12 and film 40, protecting tomatoes 12 from physical damage associated with stacking two or more packages 10 upon one another, and assisting in the maintenance of tomatoes 12 in a substantially fixed position within package 10.

Insert 30 protects tomatoes 12 from physical damage associated with stacking two or more packages 10 upon one another. Insert 30, being physically supported at its periphery by lip 24 at inner portions 26, is capable of receiving a perpendicular load applied thereupon such as by one or more packages 10 stacked thereupon. Insert 30 may or may not be sealed to lip 24, tray 20, or any other component of package 10.

Insert 30 further assists in the maintenance of tomatoes 12 in a substantially fixed position within package 10 by defining depressions 32 in the surface 31 of insert 30. Depressions 32 may contact the surfaces of and the bottom ends of tomatoes 12. Depressions 32 function in conjunction with cradles 28 and surfaces of tray 20 lateral to tomatoes 12 to hold and maintain tomatoes 12 in a substantially fixed position with respect to the remainder of package 10 regardless of the orientation of package 10. It is understood however, that film 40 may be utilized in lieu of insert 30 to provide structural support to maintain tomatoes 12 in a substantially fixed position. Cradles 28, which receive the primary load of the weight of tomatoes 12 when package 10 is in an upright position, are preferably configured to provide adequate structural support to tomatoes 12 with minimal surface contact therebetween to minimize the possibility of bruising. Further, it is preferable to minimize contact between the surfaces of tomatoes 12 and any other surfaces of package 10 for the same reason.

Insert 30 preferably prevents contact of the film 40, described hereinafter, with tomatoes 12. Insert 30 define one or more openings 34. Openings 34 allow interchange and permeation of gases through film 40 between chamber 25 and the ambient environment outside package 10. Openings 34 are preferably positioned so that film 40 cannot draw down and contact tomatoes 12 situated in chamber 25. Insert 30 and tray 20 are designed and adapted to fit together in a manner such that an opening is always defined by the combination of the two such that the gases may permeate between chamber 25 and the ambient environment outside package 10 through film 40.

Insert 30 is comprised of a relatively rigid thermoplastic material, and is preferably comprised of the same thermoplastic material as tray 20. Suitable thermoplastic materials include a polystyrene/styrene-butadiene copolymers and their blends, polyvinyl chloride, polyethylene terephthalate, polyethylene terephthalate-glycol, or a cellulosic material such as cellulose acetate propionate.

Insert 30 may be formed by any conventional plastic fabrication technique such as thermoforming or injection molding. Preferably, insert 30 is thermoformed, and has a thickness of from about 5 to about 25 mils. Lateral dimensions of insert 30 are dictated largely by the length and width of the upper portions of tray 20 and lip 24. The height, thickness and design of insert 30 is determined by tomato size and arrangement and the depth of tray 20.

Film 40 forms an airtight, water-tight seal over the top of insert 30 and tray 20. Film 40 is preferably sealed to tray 20 at lip 24, and most preferably heat sealed thereto. Film 40 will be of lateral dimensions sufficient to effect heat sealing to lip 24.

Packet 22 is held in a substantially fixed position with respect to the remainder of package 10 regardless of the orientation of package 10 when tomatoes are present therein. In other words, packet 22 will remain in substantially the same position with respect to the remainder of package 10 whether package 10 is in an upright position, upside down or sideways.

The size of packet 22 and amount of required humectant material is determined by the number and size of tomatoes 12 and their water vapor transpiration rates. Preferably there is enough material to absorb the transpired water vapor for about 7 to about 14 days and more preferably about 14 to about 21 days.

Package 10 may further comprise an overlay 50 of a material capable of receiving printed indicia. Overlay 50 may be comprised of a plastic or a paperlike material capable of receiving printed indicia, but is most preferably a paperlike material. Overlay 50 may have a degree of gas permeability sufficient to provide the desired gaseous composition within chamber 25, or may define one or more openings 52 therein to aid in gas permeation in and out of film 40.

Overlay 50 is sealed to and preferably heat sealed to the portion of film 40 heat sealed to lip 24 at the surface opposite that of the surface contacting lip 24. Overlay 50 is preferably of lateral dimensions sufficient to cover the entirety of lip 24 of tray 20. Preferably, overlay 50 will be comprised of a material heat sealing compatible with film 40.

Figure 4:
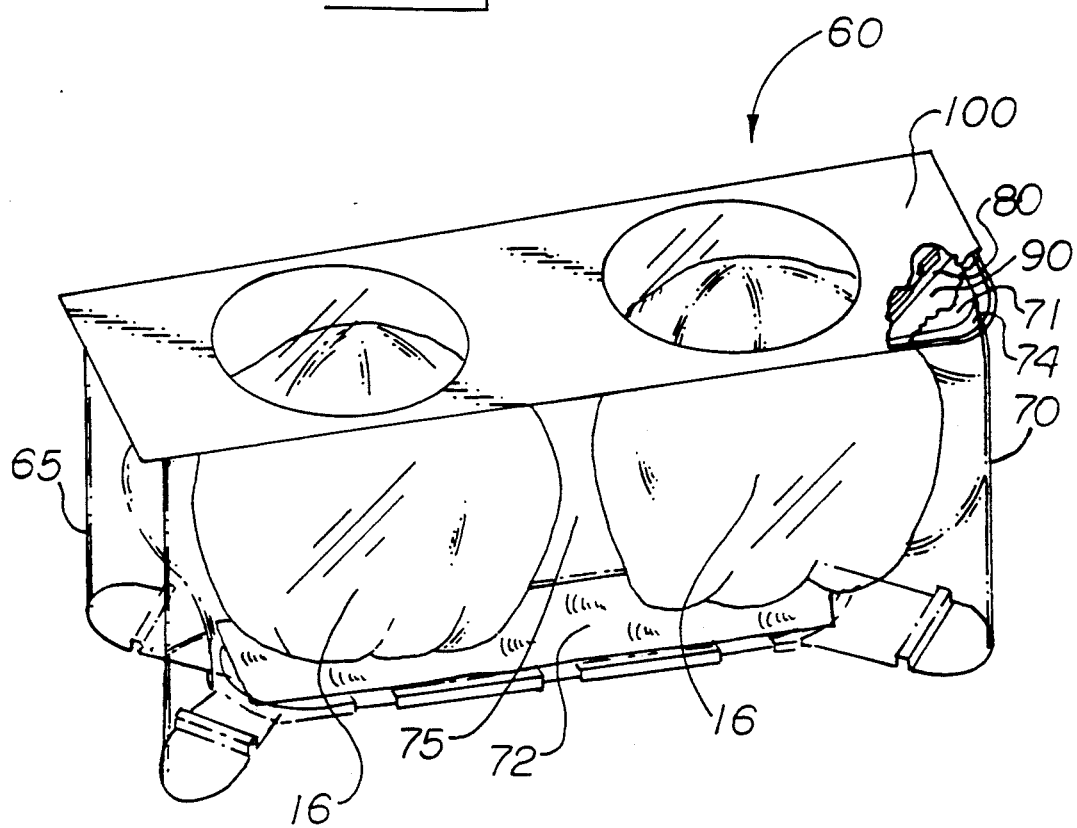
FIG. 4 is an isometric view partly broken away and fragmented of another embodiment of a controlled atmosphere, controlled humidity package for red-ripe tomatoes according to the present invention.
Figure 5:
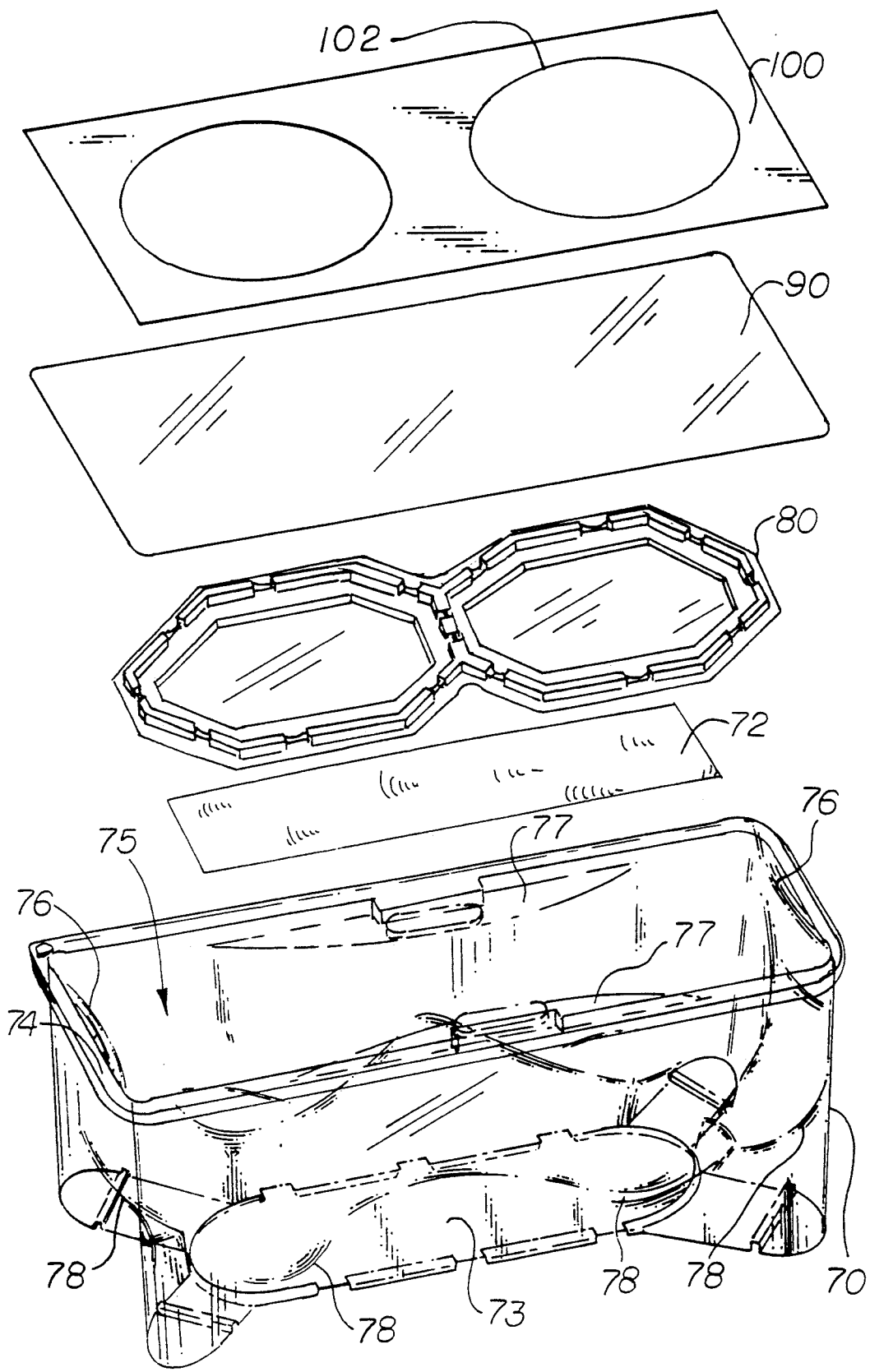
FIG. 5 is an exploded isometric view of the package of FIG. 4.

Another embodiment of the package of the present invention is referenced generally by the numeral 60, and is illustrated in FIGS. 4 and 5. Package 60 comprises a relatively rigid plastic enclosure 65, a packet 72 of a humectant material, and a film 90. Enclosure 65 comprises a tray 70 and an insert 80. As in package 10, tray 70, insert 80, film 90, and an overlay 100 are stacked sequentially. Package 60 defines a chamber 75 wherein tomatoes 16 can be situated. Tray 70 defines curved surfaces 78 which curve downwardly inward. Curved surfaces 78 cradle and receive tomatoes 16 when package 60 is in an upright position. A packet 72 of a humectant material is situated in a trough 73 defined by tray 70. Insert 80 acts as an internal lid for package 60 and is situated about the opening at the top or upper portions of the tray 70 upon flanges 76 and 77 defined by tray 70. The shape of insert 80 and its arrangement with respect to tray 70 provides openings 71 where the various gaseous components of the ambient air environment and chamber 75 can interpermeate through film 90. Film 90 is heat sealed to a lip 74 defined by tray 70. Overlay 100 may be heat sealed around its edges or periphery to the portions of film 90 which contact lip 74. Overlay 100 may have a degree of gas permeability sufficient to provide the desired gaseous composition within chamber 75, or may define one or more openings 102 therein to aid in gas permeation in and out of film 90. The composition of materials forming the components of package 60 can be similar to those employed for package 10.

Trays for package of the present invention may be comprised of a thermoplastic resin, and can be made utilizing any conventional plastic fabrication technique such as thermoforming or injection molding. Suitable thermoplastic resins include polystyrene, polystyrene/styrene-butadiene copolymers and their blends, polyvinyl chloride, polyethylene terephthalate, or polyethylene terephthalate-glycol. The most preferred thermoplastic resin is polyvinyl chloride. The thickness of the thermoplastic material comprising the tray is preferably from about 10 to about 25 mils and most preferably from about 15 to about 20 mils. The thermoplastic material comprising the tray is preferably substantially transparent such that the tomatoes within the package may be viewed through the material.

Films useful in packages of the present invention are comprised of a relatively non-rigid thermoplastic material conventionally extruded by either blown or cast methods. Preferred films are those that are permeable to both oxygen and carbon dioxide. Preferably, the film will be about 4 to about 6 and preferably about 6 to about 8 times more permeable to carbon dioxide than oxygen. A most preferred film has an oxygen permeance of about 1,000 to about 1,500 cc/100 sq. in.-day-atmosphere and the carbon dioxide permeance of about equal to or greater than 8,000 of the same.

Some thermoplastic materials suitable for films include copolymers of styrene and butadiene, polyethylene homopolymers, copolymers of ethylene and vinyl acetate, and coextrusions of both. A suitable film preferably comprises a single layer of a copolymer of ethylene and vinyl acetate. The thermoplastic material comprising the film must be heat sealable to the thermoplastic material comprising the lip of the tray. The preferred thickness of the film is dependent upon the type and characteristics of the thermoplastic material from which it was formed, but will normally be from about 0.1 to about 5 mils. The most preferred thickness of film 40 is from about 0.5 to about 2.0 mils.

Proper selection of a thermoplastic film material with the desired level of carbon dioxide permeability will allow packages according to the present invention to maintain the desired steady state levels of that gas within the chamber without the presence of an absorber material for that gas within the chamber. Though packages according to the present invention may contain a carbon dioxide absorbing material to assist the film in maintaining the desired carbon dioxide concentration levels within the chamber, proper selection of a thermoplastic material for the film renders such inclusion unnecessary.

Packages according to the present invention provide a carefully controlled environment at generally steady state of preferably about 70 to about 90 and more preferably about 70 to about 78 percent relative humidity. Further provided is an oxygen concentration within the chamber at generally steady state of preferably about 2 to about 10 and more preferably about 2 to about 4 volume percent. Further provided is a carbon dioxide concentration within the chamber at generally steady state of preferably less than about 5 percent and more preferably about 2 to less than about 4 volume percent. The below ambient levels of oxygen reduce the respiration rate, and, thus, the rate of ripening of the tomatoes. Carbon dioxide levels in excess of about 5 volume percent may render the tomato susceptible to cellular damage but some presence may enhance the viability and longevity of the tomato. The relative humidity and gaseous concentration provided by a given package may vary for different types of tomatoes because tomatoes differ in their respiration and/or transpiration rates. Thus, preferred and most preferred ranges for relative humidity and gaseous concentration may vary somewhat according to the type of tomato.

Approximate steady state between the permeation through the film of oxygen into and carbon dioxide out of the package generally occurs after the tomatoes have been packaged for about two days. Steady state may also be accomplished by gas flushing when the package is packed and sealed. When the tomatoes are first packaged, the composition of the gaseous environment within the chamber containing the tomatoes is the same as in the ambient gaseous environment where the tomatoes were packaged. As the tomatoes respire, the level of oxygen decreases and the level of carbon dioxide increases within the chamber. After about two days, the tomatoes have respired to such an extent that the oxygen content within the chamber has decreased to about 2 to about 10 volume percent and the carbon dioxide content has increased to a level not exceeding about 5 volume percent.

Maintenance of a lower than ambient oxygen content within the chamber slows the respiration rate of the tomatoes, and, thus, the ripening process. The slowing of the ripening process lengthens the duration of the desirable red ripe stage. The desirable levels of oxygen and carbon dioxide can be maintained in the chamber for preferably about 7 to about 14 days and more preferably about 14 to about 21 days, after which point the quality of tomatoes can be expected to decline. If the package is maintained at below ambient temperatures such as about 50–60 degrees F., the fruit may be maintained in the red ripe stage for still longer periods because of the lower respiration rate of the tomatoes.

The steady state levels for oxygen and carbon dioxide within the chamber are determined by the permeability of the film for each of them. The permeability is determined by the characteristics of the film and the partial pressure gradients for each of oxygen and carbon dioxide across the film. The greater the partial pressure gradient between the chamber and the ambient environment outside the package for either gas, the greater the flux therein or thereout.

At steady state, the film preferably has an oxygen and carbon dioxide permeability rate about equal to the respiration rate of the tomatoes. In other words, the rate of permeation of oxygen into the film will about equal the projected rate of respiration of oxygen by the tomatoes, and the projected rate of permeation of carbon dioxide out of the film will about equal the projected rate of respiration of carbon dioxide by the tomatoes.

Packages according to the present invention preferably define an opening wherein the film may be exposed to the gaseous environment confined within the chamber on one surface and on its opposite surface be exposed to the ambient gaseous environment. In package 10, film 40 separates the gaseous environment of chamber 25 and the ambient gasous environment at openings 34 in insert 30.

The humectant material contained within packet 22 preferably maintains the desired relative humidity of package 10 at a generally constant level. Packet 22 comprises a patch material of water vapor permeable, substantially liquid water impermeable material and a humectant material. Suitable patch material include cellulose acetate and Tyvek (trademark of the E. I. DuPont de Nemours & Co.) nonwoven polyethylene fabric.

Humectant material suitable for use in the packages of the present invention include conventional humectant or desiccant materials such as chloride salts, sulphate salts, silica gel, or activated alumina. Preferred humectant materials exhibit only negligible absorption of water vapor up until about 70 percent relative humidity. Preferred materials will maintain levels of relative humidity of preferably about 70 to about 90 and more preferably about 70 to about 78 percent in the chamber of the package at customary room temperature, and will further preferably maintain them over a temperature range of about 50° to about 90° F. in the chamber. Such materials include sodium chloride, mannitol, and sorbitol. The most preferred material is sodium chloride due to its low cost, low toxicity, familiarity to consumers, and excellent performance.

Relative humidities of between about 70 and about 90 percent are preferred in packages of the present invention because levels below about 70 percent may result in excessive shriveling of tomatoes due to dehydration and levels in excess of about 90 percent may result in increased mold growth and liquid water buildup. A relative humidity of about 70 to about 78 percent is most preferred.

In packages according to the present invention, packets of humectant material are located in proximity to and preferably within about one inch of the stem scars of the tomatoes. Such proximity to the stem scars allows substantial absorption of water vapor by the humectant material, and minimizes formation of localized regions of excessive water vapor or liquid water resulting from condensation therefrom. Preferably, the packet of humectant material does not contact or is not contiguous to the stem scars because such contact may operate to seal in water vapor. Further, the view of the stem scar may be obstructed.

Packages according to the present invention preferably maintain a substantially uniform relative humidity and gaseous composition within all regions of the chamber thereof. A substantially uniform relative humidity means that the humidity varies no more than about 20 and preferably less than about 10 percent from any given region of the chamber to another. The package preferably defines a chamber structurally configured to provide sufficient mass transfer among all gaseous regions surrounding the tomato so that localized concentrations of water vapor or condensate do not develop to more than a negligible extent. Preferably, no region of the chamber is sealed off from other regions by contacting surfaces of the tomato or tomatoes and the package. Further preferably, no surface of the package is in direct contact with the stem scar to minimize localization of water vapor and/or condensate. Proximity of the absorber packet to the stem scars of the tomatoes also aids in minimizing localization of water vapor and/or condensate, and, thus, in maintaining a substantially uniform relative humidity.

Inserts may be modified according to the present invention to provide a compartment therewithin to contain a humectant material as the functional equivalent of a packet of humectant material. Such a compartment may define a microporous or other water vapor permeable layer on the underside of the insert so that the humectant material will be in close proximity to but not contacting the stem scars of the tomatoes. With such a compartment defined within the insert, tomatoes may be situated right side or stem scar up in the package. Further, the packet of humectant material may be attached to or positioned beneath the underside of an insert. With the insert positioned beneath the insert, the tomatoes may be situated right side or stem scar side up.

Packages of the present invention also define means for maintaining the separation and lack of physical contact of the tomatoes regardless of the orientation of the package. In package 60, the separation and lack of physical contact of tomatoes 16 is maintained by holding and maintaining tomatoes 16 in separate positions by various surfaces located above, below, and lateral to tomatoes 16 in the form of tray 70, curved surfaces 78 of tray 70, and insert 80.

Packages of the present invention are configured to minimize contact between the surfaces of the tomato or tomatoes and the surfaces of the package in order to minimize the possibility of bruising and to enhance gaseous circulation in the chamber. The rigid packages are configured such that the tomato or tomatoes is held in a substantially fixed position in the package by contact between the surfaces of the tomatoes and the package at multiple points and regions around the tomato. Contact at multiple points and regions results in the tomato or tomatoes being held in a substantially fixed position in the package with minimal physical contact between the two. Preferably, less than about 20 percent of the total surface area of the tomato or tomatoes is in physical contact with the package regardless of the orientation of the package. Further preferably, any given point or region of contact comprises no more than about 10 percent of the total surface area of the tomato or tomatoes regardless of the orientation of the package.

It is understood that the packages of the present invention may be used with perishable fruits other than tomatoes.

According to the present invention, a process for packaging a tomato comprises providing a package which defines a chamber therein, introducing one or more tomatoes within the chamber, maintaining the tomato in a substantially fixed position relative to the package regardless of the orientation of the package, and maintaining a substantially uniform relative humidity in the chamber at steady state. Preferably, the process further comprises maintaining the tomato at a relative humidity of about 70 to about 90 percent and more preferably about 70 to about 78 percent of water vapor saturation at steady state for preferably about 7 to about 14 and more preferably about 14 to about 21 days. Preferably, such desired relative humidity levels are maintainable over a temperature range of about 50° F. to about 90° F. in the chamber. Preferably, the process further comprises maintaining the tomato at a gaseous composition of about 2 to about 10 volume percent oxygen and less than about 5 volume percent carbon dioxide at steady state for preferably about 7 to about 14 and more preferably about 14 to about 21 days. More preferably, the process further comprises maintaining the tomato at a gaseous composition of about 2 to about 4 volume percent oxygen and about 2 to about 4 volume percent carbon dioxide at steady state. Preferably, the process further comprises maintaining physical separation and lack of contact between tomatoes if there are two or more tomatoes in the package regardless of the orientation of the package. Preferably, the tomato is physically contacted by the package at less than about 20 percent and more preferably less than about 10 percent of the total surface area of the tomato regardless of the orientation of the package.

The examples below are provided to further illustrate the present invention, and are not to be construed as limiting.

EXAMPLE

A package of the present invention similar to the embodiment shown in FIGS. 4 and 5 was tested for its performance in maintaining proper chamber environment and saleability of red-ripe tomatoes (Group I). The performance of a second package (Group II) was compared to that of Group I. The packages of Group II differed primarily from those of Group I in that those of Group II did not contain a packet of humectant material and the film was perforated with holes of about 1 cm in diameter in each of the four corners of the package to allow exchange of air between the chamber of the package and the environment in which the package was situated. The performance of the packages of Group I were also compared with that of a control group of tomatoes (Group III). The atmosphere in the chambers of both the packages of Group II and the boxes of Group III was largely uncontrolled.

Each package of Groups I and II contained two tomatoes. The film like that of film 90 of the packages of Group I was formed from ELVAX 3190 (marketed by E. I. du Pont deNemours & Company) brand ethylene-vinyl acetate copolymer resin, and was 1.2 mils thick. The film used in the packages of Group II was an EVA-coated polyester, and was 1.0 mil thick. The absorbant material was 15 grams of NaCl contained within a Tyvek (marketed by E.I. du Pont De Nemours & Co.) pouch.

Tomatoes tested were harvested vine-ripe in Florida, and were subsequently washed with soapy water, rinsed with 5.0 ppm chlorinated water, and air-dried. The tomatoes were placed in the packages described above for Groups I and II, and placed in corrugated tomato boxes in Group III. There were 96 packages of tomatoes in Groups I and 72 packages in Group II, and 111 tomatoes total in Group III. Each package of Groups I and II contained tomatoes weighing about 380 grams.

The packages of Groups I and II and the boxes of tomatoes of Group III were packed in corrugated cases with 24 packages to a case in two stacked levels of twelve. The cases shipped from Georgia to Alabama to Indiana, and examined there after 7 days from the time of initial packaging. The cases were then shipped to Michigan, and examined after 14 days from the time of initial packaging.

The tomatoes were examined at 7 days and 14 days for saleability. A tomato was deemed saleable if it had no bruises, cuts, or mold formation visible to the naked eye. The packages of Groups I and II were examined for saleability as a unit. If one of the two tomatoes was deemed unsaleable, then the entire package was deemed unsaleable. The tomatoes of Group III were examined for saleability individually. All tomatoes tested were deemed saleable prior to their placement in the packages and boxes herein described.

For the packages of Group I, 96.9 percent were deemed saleable after 7 days, and 54 percent were saleable after 14 days. For the packages of Group II, 64 percent were saleable after 7 days, and 30 percent were saleable after 14 days. For the individual tomatoes of Group III, 80 percent were saleable after 7 days, and 26 percent were saleable after 14 days. Thus, the packages of Group I according to the present invention offer significantly increased shelf life over the uncontrolled atmospere packages of Group II and cell-divided boxes of Group III.

The relative humidity within the chambers of the packages of each of Groups I and II was compared. The packages of Group I had a mean relative humidity of 72.1 percent after 9 days. The packages of Group II had a mean relative humidity of 79.5 percent after 9 days. The packages of Group I according to the present invention offer a lower humidity level than the uncontrolled atmosphere packages of Group II while still being within preferred relative humidity ranges. A lower relative humidity lowers the likelihood of formation of mold. The reason the relative humidities were as close as they were is that the type of tomatoes selected for the tests are known to have lower than average transpiration rates for tomatoes in general.

The oxygen and carbon dioxide concentrations within the chambers of the packages of Group I were analyzed by gas chromatograph. The packages of Group I which exhibited a high degree of sealing between the film and the lid of the tray of the package as evidenced by the presence of drawdown in the package had a mean oxygen concentration of 2.3 volume percent and a mean carbon dioxide concentration of 3.7 percent after 7 days. Thus, the packages of Group I maintained desirable, substantially below ambient levels of oxygen and desirable, controlled levels of carbon dioxide.

While embodiments of packages and a process for packaging of the present invention have been shown with regard to specific details, it will be appreciated that depending upon the manufacturing process and the manufacturer's desires, the present invention may be modified by various changes while still being fairly within the scope of the novel teachings and principles herein set forth.

What is claimed is:

1. A controlled atmosphere package containing at least one tomato comprising:
   a relatively rigid plastic enclosure, said enclosure comprising a tray having sidewalls and a bottom wall defining a chamber and containing at least one tomato, the at least one tomato having a stem soar, the side walls of said tray extending upwardly above said at least one tomato and defining an open mouth of the tray bounded by a flange around the upper edge of the side walls;
   said tray defining at least one means for cradling said at least one tomato in said chamber, with said at least one tomato being received in said at least one cradle means respectively;
   said bottom wall of said tray including a trough which opens toward the chamber;
   said trough containing a gas permeable packet containing a humectant material in an amount sufficient to maintain a substantially controlled relative humidity within the enclosure;
   said trough being configured to maintain the packet in close proximity to the at least one tomato stem scar with the at least one tomato positioned with its stem scar facing downwardly toward the at least one cradle means;
   said plastic enclosure further including an insert which rests on said flange;
   said insert further including depressions projecting downwardly and into contact with said at least one tomato;
   said depressions in conjunction with said at least one cradle means and said walls of said tray as well as said trough are configured to maintain said at least one tomato in a substantially fixed position with respect to the remainder of the package and to maintain the packet in substantially fixed, spaced relation with respect to and in close proximity to the at least one tomato stem scar regardless of the orientation of the package;
   said enclosure defining said chamber being structurally configured to provide sufficient mass transfer among all gaseous regions surrounding said at least one tomato to allow said at least one tomato to breathe;
   said package further including a relatively non-rigid gas permeable plastic film enclosing said insert and secured to said flange to seal said open mouth.

2. The package according to claim 1, wherein
   the humectant material exhibits only negligible absorption of water vapor up until about 70 percent relative humidity; and
   the packet of humectant material is situated within about one inch of the stem scar.

3. The package according to claim 2, wherein the humectant material is sodium chlorine.

4. The package according to claim 1, wherein a second tomato is situated in the enclosure.

5. The package according to claim 4, wherein the package maintains the tomatoes substantially separate from each other regardless of the orientation of the package.

6. The package according to claim 1, wherein less than about 20 percent of the total surface area of the tomato is in physical contact with the package regardless of the orientation of the package.

7. The package according to claim 1, wherein any region of physical contact between said at least one tomato and said package comprises no more than about 10 percent of the total surface area of the tomato regardless of the orientation of the package.

8. The package according to claim 1, wherein the package further comprises an overlay of a material capable of receiving printed indicia situated about the enclosure at the opening therein and sealed to the portion of the film sealed to the enclosure at the surface opposite that of the surface sealed to the enclosure, the overlay optionally defining an opening therein.

9. The package according to claim 1, wherein the packet has water vapor permeable, liquid water impermeable walls.

10. The package according to claim 1, wherein the film has an oxygen permeability of about 1,000 to about 1,500 cc/100 sq. in.-day-atm. and a carbon dioxide permeability of about equal to or greater than 8000 cc/100 sq. in.-day-atm.

11. The package according to claim 1, wherein the gaseous environment within the chamber is at a relative humidity of about 70 to about 90 percent.

12. The package according to claim 1, wherein the gaseous environment of the chamber is at a gaseous composition of about 2 to about 10 volume percent oxygen and less than about 5 volume percent carbon dioxide.

13. A process for packaging at least one tomato comprising packaging said at least one tomato in the package of claim 1.

* * * * *